(12) United States Patent
Kamiyama

(10) Patent No.: US 10,479,137 B2
(45) Date of Patent: Nov. 19, 2019

(54) VEHICLE WHEEL

(71) Applicant: HONDA MOTOR CO., LTD., Minato-ku, Tokyo (JP)

(72) Inventor: Yoichi Kamiyama, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 98 days.

(21) Appl. No.: 15/556,885

(22) PCT Filed: Feb. 25, 2016

(86) PCT No.: PCT/JP2016/055578
§ 371 (c)(1),
(2) Date: Sep. 8, 2017

(87) PCT Pub. No.: WO2016/143533
PCT Pub. Date: Sep. 15, 2016

(65) Prior Publication Data
US 2018/0022151 A1 Jan. 25, 2018

(30) Foreign Application Priority Data
Mar. 9, 2015 (JP) ................................ 2015-046240

(51) Int. Cl.
*B60B 21/12* (2006.01)
*B60B 21/02* (2006.01)
*G10K 11/172* (2006.01)

(52) U.S. Cl.
CPC ............. *B60B 21/12* (2013.01); *B60B 21/02* (2013.01); *G10K 11/172* (2013.01);
(Continued)

(58) Field of Classification Search
CPC ... B60B 21/12; B60B 21/02; B60B 2900/133; B60B 2900/113; B60B 2900/111; B60B 2900/112; G10K 11/172
(Continued)

(56) References Cited

U.S. PATENT DOCUMENTS 5,462,331 A 10/1995 Stief et al.
6,422,655 B1 * 7/2002 Britton .................. B60C 19/002
152/153

(Continued)

FOREIGN PATENT DOCUMENTS

JP H06-206578 A 7/1994
JP 2005-014758 A 1/2005
(Continued)

*Primary Examiner* — S. Joseph Morano
*Assistant Examiner* — Jean W Charleston
(74) *Attorney, Agent, or Firm* — Carrier Blackman & Associates, P.C.; William D. Blackman; Joseph P. Carrier

(57) ABSTRACT

A vehicle wheel is provided which includes a sub air chamber member capable of suppressing a surface deformation amount in case of an action of an internal pressure of the sub air chamber member. A sub air chamber member of a vehicle wheel includes an upper surface member, a lower surface member, and bridge sections causing the upper surface member and the lower surface member to strike on each other. An end-to-end distance of an opening part of a bridge section opening on an upper surface of the upper surface member is set longer than a distance to an end portion of an opening part of another bridge section adjacent thereto. Moreover, the area of the opening parts of the bridge sections opening on the upper surface of the upper surface member is larger than the area of other general parts.

9 Claims, 10 Drawing Sheets

(52) U.S. Cl.
CPC .... *B60B 2900/111* (2013.01); *B60B 2900/112* (2013.01); *B60B 2900/113* (2013.01); *B60B 2900/133* (2013.01)

(58) Field of Classification Search
USPC ...................................... 152/381.6
See application file for complete search history.

(56) References Cited

U.S. PATENT DOCUMENTS

| | | | | |
|---|---|---|---|---|
| 6,516,849 | B2* | 2/2003 | Flament | B60C 3/06 |
| | | | | 152/381.5 |
| 7,690,410 | B2* | 4/2010 | Kamiyama | B60B 3/044 |
| | | | | 152/381.5 |
| 8,196,628 | B2* | 6/2012 | Fowler-Hawkins | |
| | | | | B60C 19/002 |
| | | | | 152/339.1 |
| 8,720,641 | B2 | 5/2014 | Fisk et al. | |
| 9,649,892 | B2 | 5/2017 | Ishii et al. | |
| 2001/0007288 | A1* | 7/2001 | Brofman | H01L 24/83 |
| | | | | 174/260 |
| 2012/0125710 | A1* | 5/2012 | Fisk | B32B 15/06 |
| | | | | 181/290 |
| 2016/0001596 | A1* | 1/2016 | Kamiyama | B60B 21/02 |
| | | | | 301/95.104 |

FOREIGN PATENT DOCUMENTS

| | | |
|---|---|---|
| JP | 2009-145739 A | 7/2009 |
| JP | 2012-016973 A | 1/2012 |
| JP | 2013-501658 A | 1/2013 |
| WO | 2014/188815 A1 | 11/2014 |

* cited by examiner

FIG.7 [COMPARATIVE EXAMPLE]

VEHICLE WHEEL

TECHNICAL FIELD

The present invention relates to a vehicle wheel.

BACKGROUND ART

A conventional wheel for reducing road noise attributed to air column resonance inside a tire air chamber is configured such that a sub air chamber member functioning as a Helmholtz resonator is fixed to an outer peripheral surface of a well portion inside the tire air chamber.

Patent Literature 1 discloses a resonator including a body portion to be attached to an outer peripheral portion of a wheel to which a tire is attached, and provided with multiple sub air chambers partitioned from one another and multiple communication units which establish communication of the sub air chambers to the air chamber, respectively. Here, the resonator forms multiple resonator units, each of which includes one of the sub air chambers and the corresponding communication unit communicating with the sub air chamber.

CITATION LIST

Patent Literature

Patent Literature 1: Japanese Patent Application Publication No. 2012-16973

SUMMARY OF INVENTION

Technical Problem

However, the conventional resonator including the sub air chambers as described above does not consider variations in internal pressure of each sub air chamber (an internal pressure inside each sub air chamber). Such a variation in internal pressure of the sub air chamber increases a surface deformation amount, which leads to deterioration in sound deadening effect and causes a problem of a failure to sufficiently reduce the road noise attributed to the air column resonance in the tire air chamber.

Given the circumstances, it is an object of the present invention to provide a vehicle wheel including a sub air chamber member, which is capable of suppressing a surface deformation amount in case of an action of an internal pressure of the sub air chamber member.

Solution to Problem

To solve the problem, a vehicle wheel according to claim 1 provides a vehicle wheel including a sub air chamber member as a Helmholtz resonator located in a tire air chamber and on an outer peripheral surface of a well portion, which is characterized in that the sub air chamber member includes: an upper surface member disposed inside the tire air chamber; a lower surface member disposed on an outer peripheral surface side of the well portion; and bridge sections formed by causing the upper surface member and the lower surface member to strike on and get joined to each other. Here, an end-to-end distance of an opening part of one of the bridge sections opening on an upper surface of the upper surface member is set longer than a distance to an end portion of an opening part of another one of the bridge sections adjacent thereto.

According to this configuration, it is possible to enhance a sound deadening amount by suppressing a surface deformation amount at the time of an action of an internal pressure of the sub air chamber member (a sub air chamber).

The vehicle wheel according to claim 2 is characterized in that an area of the opening parts of the bridge sections opening on the upper surface of the upper surface member is larger than an area of other general parts.

According to this configuration, it is possible to further enhance surface rigidity.

The vehicle wheel according to claim 3 is characterized in that each bridge section is formed into a fan shape in which a distance between two opposed side surfaces becomes longer as the side surfaces come closer to the upper surface of the upper surface member.

According to this configuration, it is possible to secure the large area of the opening parts of the bridge sections opening on the upper surface of the upper surface member, and thus to enhance the surface rigidity.

The vehicle wheel according to claim 4 is characterized in that, in each bridge section, only the upper surface member is recessed toward the lower surface member and strikes on the lower surface member.

According to this configuration, it is possible to secure the large area of the opening parts of the bridge sections. At the same time, the lower surface member does not include any bridge sections. Thus, it is possible to ensure a volume of the resonator.

The vehicle wheel according to claim 5 is characterized in that the sub air chamber member includes an engagement portion provided at an end portion thereof and designed to be engaged with the well portion, and the end-to-end distance of the opening part of each bridge section opening on the upper surface of the upper surface member is set longer than a distance from an end portion of the opening part of the bridge section to the engagement portion.

According to this configuration, when the sub air chamber member is attached to the well portion, it is possible to enhance the sound deadening amount by further suppressing the surface deformation amount at the time of the action of the internal pressure of the sub air chamber member.

Advantageous Effects of Invention

According to the present invention, it is possible to provide a vehicle wheel including a sub air chamber member, which is capable of suppressing a surface deformation amount in case of an action of an internal pressure of the sub air chamber member.

DESCRIPTION OF EMBODIMENTS

A vehicle wheel of the present invention includes a sub air chamber member (a Helmholtz resonator) for deadening road noise attributed to air column resonance inside a tire air chamber, which is located on an outer peripheral surface of a well portion.

In the following, an overall configuration of the vehicle wheel will be described and then the sub air chamber member will be described in detail.

Figure 1:
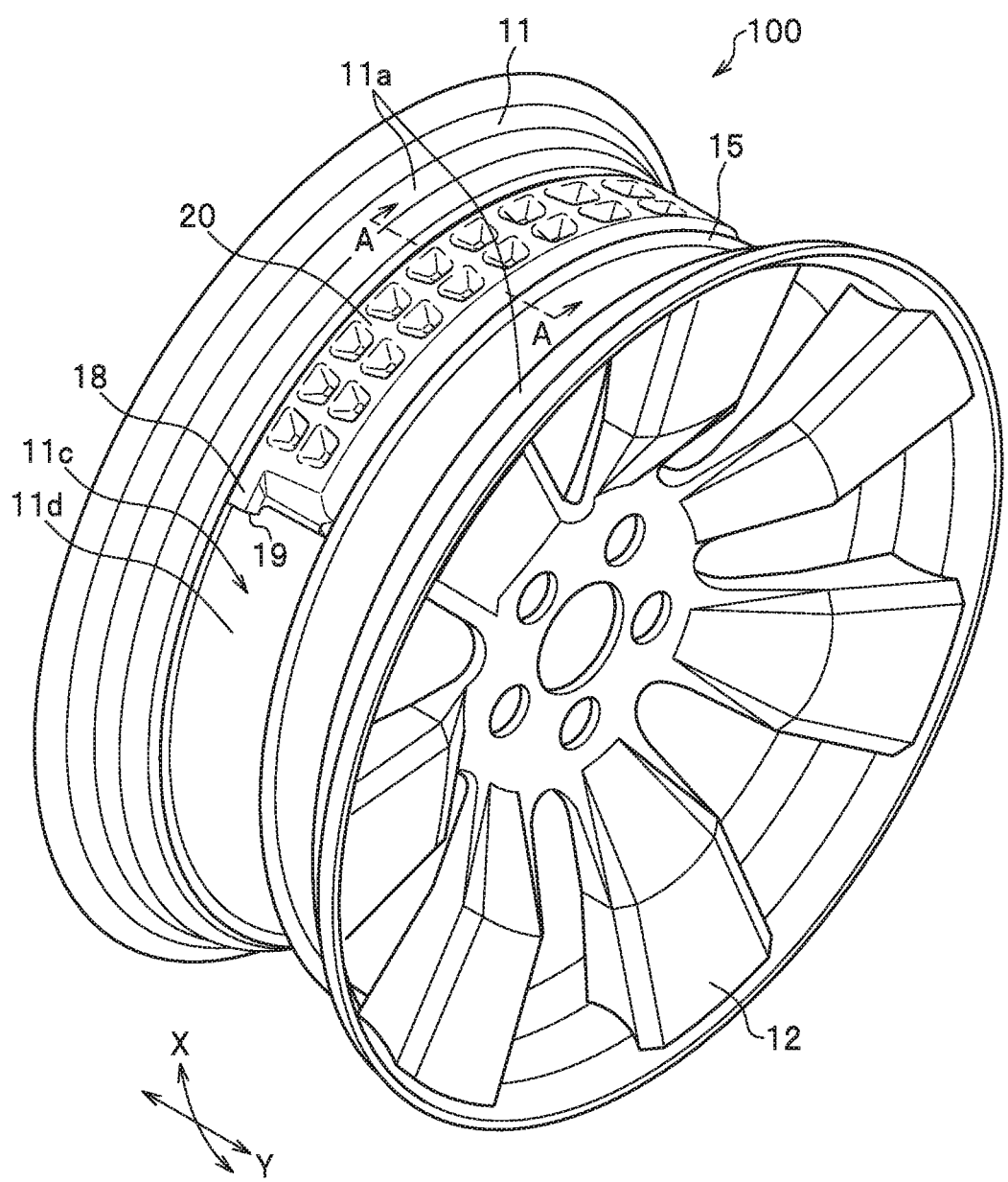
FIG. 1 is a perspective view of a vehicle wheel according to an embodiment of the present invention.

FIG. 1 is a perspective view of a vehicle wheel 100 according to an embodiment of the present invention.

As shown in FIG. 1, the vehicle wheel 100 includes a rim 11, and a disc 12 for connecting the rim 11 to a hub (not shown). The rim 11 includes a well portion 11c, which is located between bead seat portions 11a and 11a formed at two end portions in a wheel width direction Y shown in FIG. 1, and is recessed inward in a wheel radial direction (toward the rotation center).

The well portion 11c is provided in order to install bead portions (not shown) of a tire (see FIG. 6) at the time of rim assembly to attach the tire to the rim 11. Incidentally, the well portion 11c of this embodiment is formed into a cylindrical shape having substantially the same diameter across the wheel width direction Y.

In FIG. 1, reference sign 11d denotes an outer peripheral surface of the well portion 11c. Reference sign 18 denotes a tube body in which a communication hole 19 (see FIG. 2) to be described later is formed. The tube body 18 is provided to a sub air chamber member 20. Reference sign 15 denotes an annular vertical wall provided on the outer peripheral surface 11d of the well portion 11c in such a way as to extend in a circumferential direction of the rim 11. Incidentally, the sub air chamber member 20 (the Helmholtz resonator) is locked with the vertical wall 15 as described later. Note that reference numeral X in FIG. 1 denotes a wheel circumferential direction.

[Configuration of Sub Air Chamber Member 20]

Next, the sub air chamber member 20 will be described.

Figure 2:
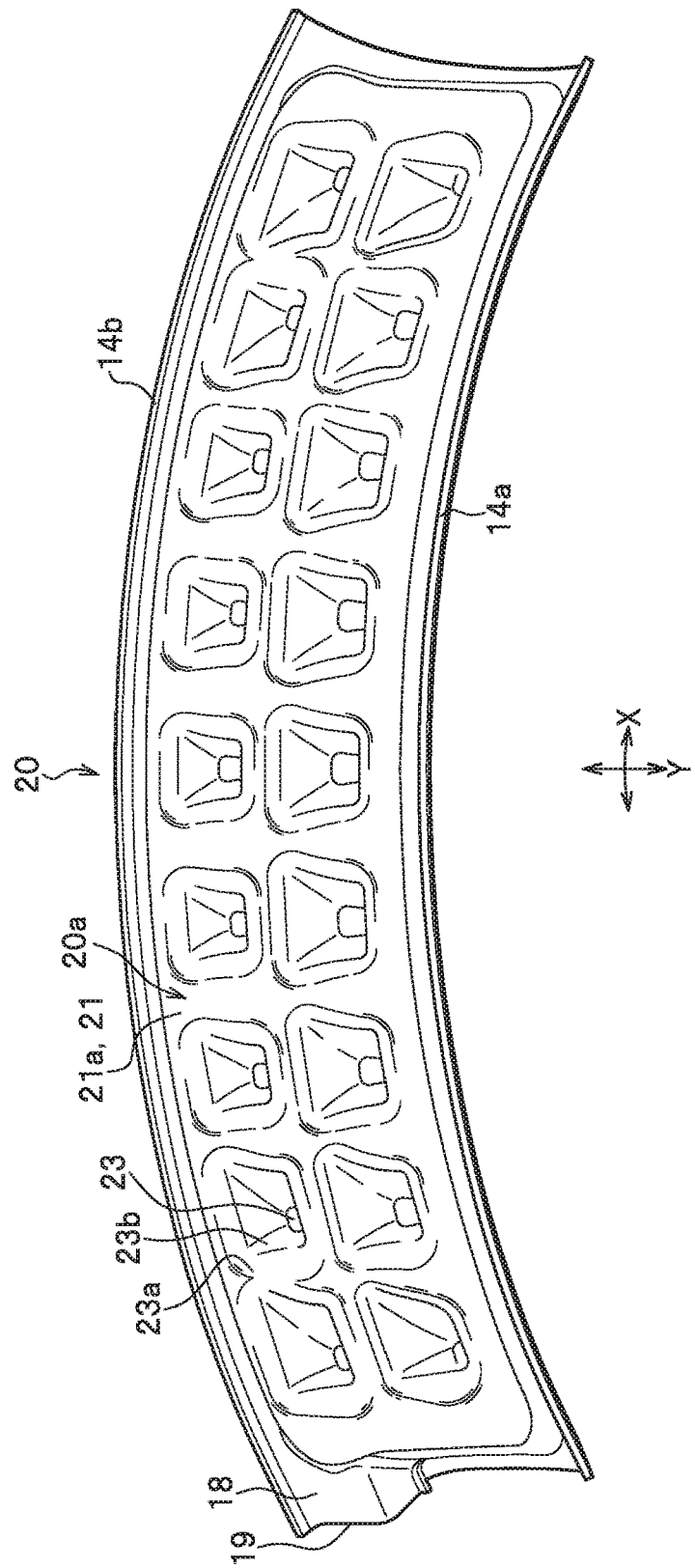
FIG. 2 is an overall perspective view of a sub air chamber member of the vehicle wheel according to the embodiment.
Figure 3:
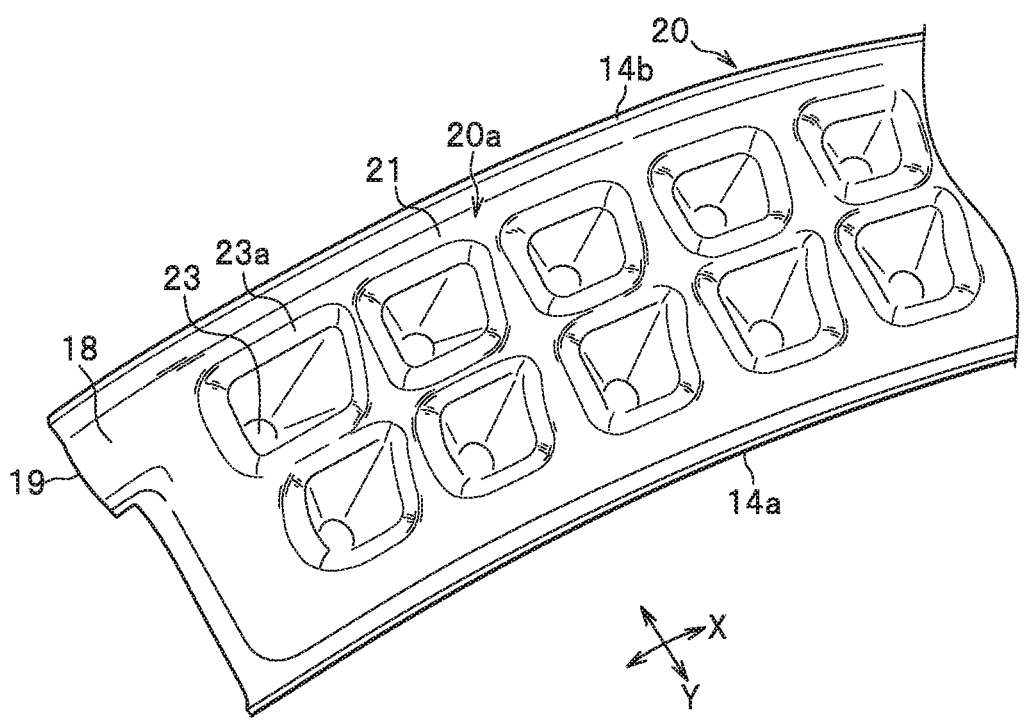
FIG. 3 is a perspective view of a substantial part of an upper surface of the sub air chamber member viewed from a convex side in FIG. 2.
Figure 4A:
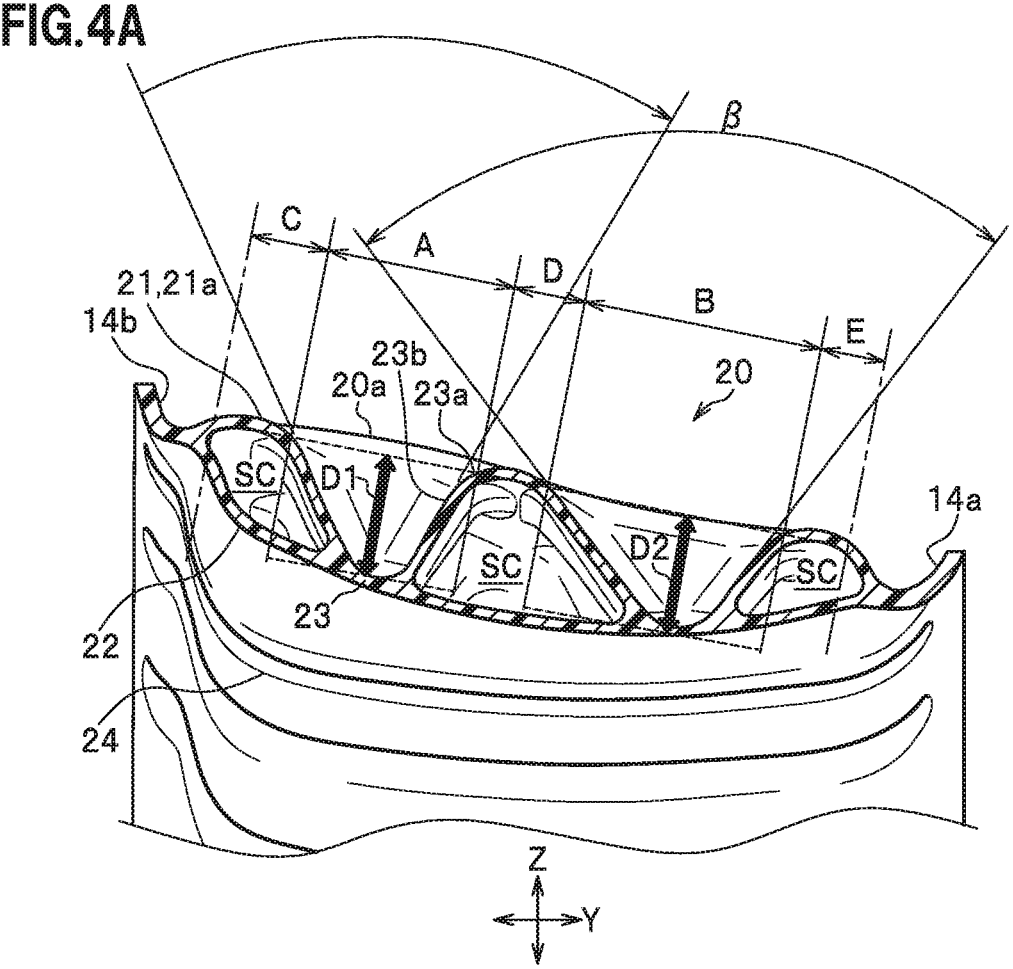
FIG. 4A is a cross-sectional view showing the sub air chamber member cut away along the A-A line in FIG. 1.
Figure 5:
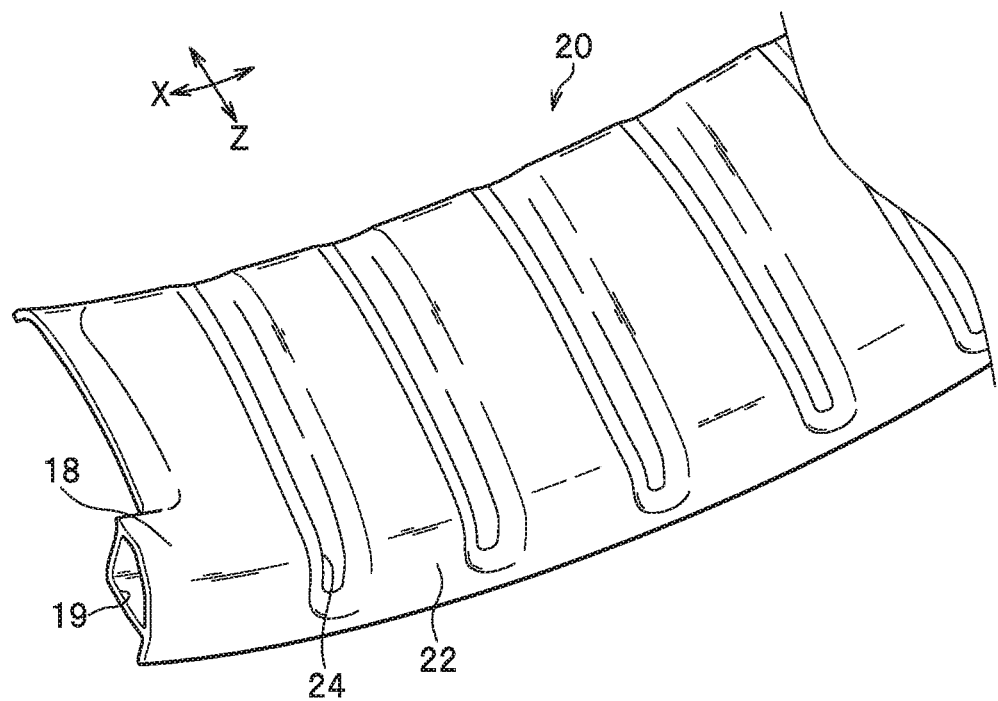
FIG. 5 is a perspective view of a substantial part of a lower surface of the sub air chamber member viewed from a concave side in FIG. 2.

FIG. 2 is an overall perspective view of the sub air chamber member 20. FIG. 3 is a perspective view of a substantial part of an upper surface of the sub air chamber member 20 viewed from a convex side in FIG. 2. FIG. 4A is a cross-sectional view showing the sub air chamber member 20 cut away along the A-A line in FIG. 1. FIG. 5 is a perspective view of a substantial part of a lower surface of the sub air chamber member 20 viewed from a concave side in FIG. 2.

Figure 6:
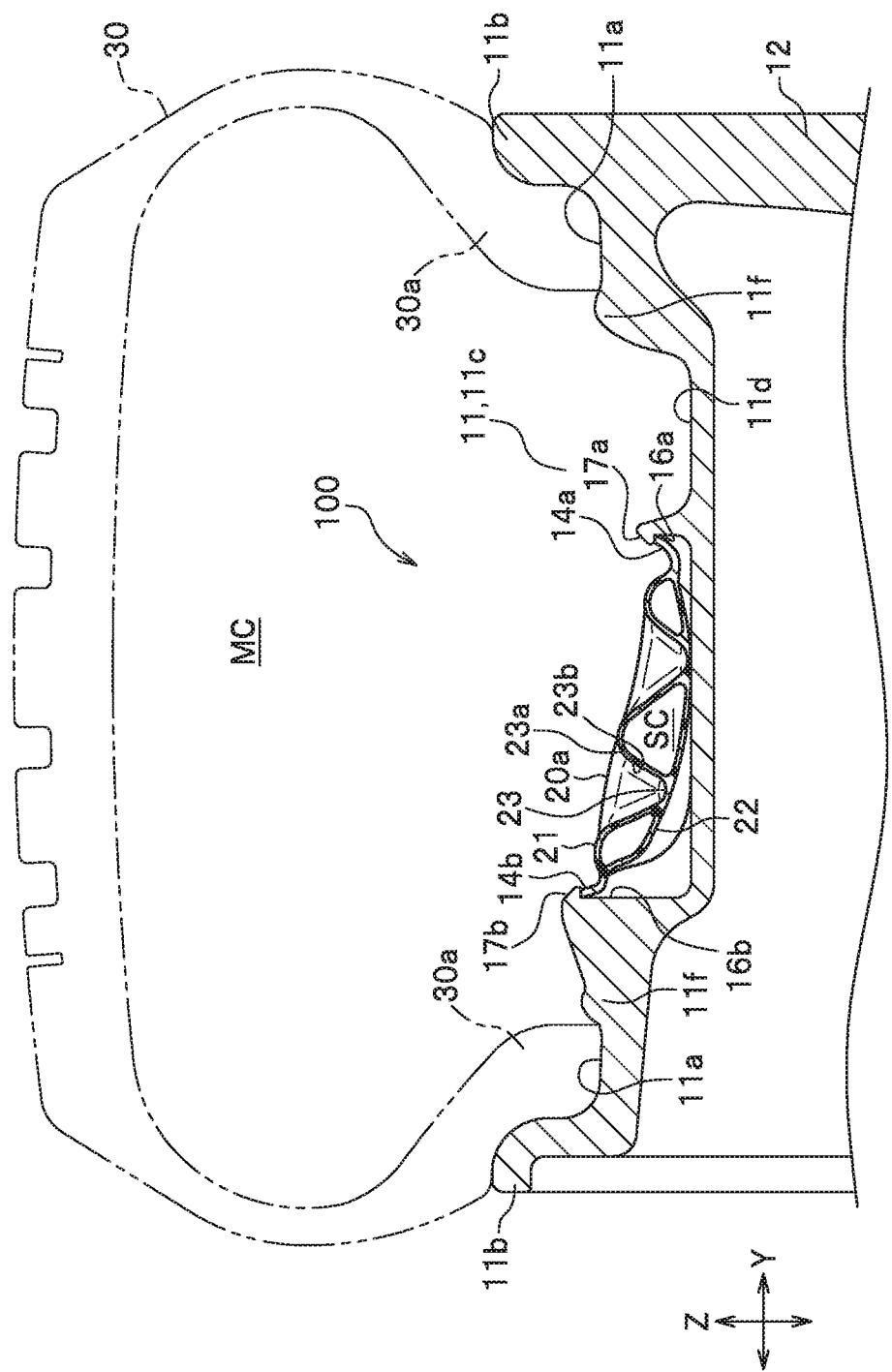
FIG. 6 is a partial cross-sectional view of the vehicle wheel according to the embodiment, which shows positional relations among the sub air chamber member attached to a well portion of the vehicle wheel according to the embodiment, as well as hump portions and a vertical wall thereof.

As shown in FIG. 2, the sub air chamber member 20 is a member which is elongated in one direction, and includes a hollow body portion 20a having a sub air chamber SC (see FIG. 4A) inside, and edge portions 14a and 14b to cause the body portion 20a to be locked with first and second vertical wall surfaces 16a and 16b (see FIG. 6). The edge portions 14a and 14b are end portions (engagement portions) to be engaged with the well portion 11c of the wheel. Note that the sub air chamber SC will be described later.

The sub air chamber member 20 is curved in a longitudinal direction so as to be aligned with the wheel circumferential direction X when attached to the outer peripheral surface 11d (see FIG. 1) of the well portion 11c (see FIG. 1). Reference sign 18 denotes the tube body constituting part of the body portion 20a, and the communication hole 19 communicating with the sub air chamber SC (see FIG. 4A) is formed inside the tube body 18. The communication hole 19 in the tube body 18 extending in the wheel circumferential direction X communicates with the sub air chamber SC on one end side in the wheel circumferential direction X shown in FIG. 4A, and is opened to outside on the other end side. Reference sign Y denotes the wheel width direction. The communication hole 19 will be described later.

As shown in FIG. 3, the sub air chamber member 20 includes the body portion 20a, which exhibits an elongated rectangular shape in planar view and in which the sub air chamber SC (see FIG. 4A) is formed. A section of the body portion 20a exclusive of the tube body 18 exhibits the elongated rectangular shape in view from above (in planar view) as shown in FIG. 3.

As shown in FIG. 4A and FIG. 5, the body portion 20a of the sub air chamber member 20 includes an upper surface member 21, a lower surface member 22 which forms the sub air chamber SC being a single continuous space in conjunction with the upper surface member 21, and multiple bridge sections 23 which cause the upper surface member 21 and the lower surface member 22 to strike on and get joined to each other.

The upper surface member 21 forms the sub air chamber SC by being curved so as to provide bulges above the lower surface member 22, which faces the tire air chamber and is disposed along the outer peripheral surface 11d side of the well portion 11c.

As shown in FIG. 4A, the upper surface member 21 and the lower surface member 22 are formed of thick resin members having a thickness d. Here, resin materials constituting the upper surface member 21 and the lower surface member 22 of this embodiment have the same thickness, respectively. However, thicknesses of these materials may be different from each other.

As shown in FIGS. 2 to 4A, each bridge section 23 constitutes a bridge portion (see FIG. 4A) formed by causing the upper surface member 21 and the lower surface member 22 to strike on and get partially joined to each other. Specifically, in each bridge section 23, the upper surface member 21 is formed to be recessed toward the lower surface member 22, and a front end portion of the recess strikes on the lower surface member 22 and is integrated with the lower surface member 22 at the striking portion. Then, the bridge section 23 is formed by partially joining the upper surface member 21 to the lower surface member 22. In this case, the bride section 23 is supposed to have sufficient strength for avoiding detachment even by a centrifugal force in the course of traveling.

The bridge sections 23 are set such that an end-to-end distance of each bridge section 23 on an upper surface 21a of the upper surface member 21 is longer than a distance between the bridge sections 23 on the upper surface 21a (to be described later in Operation and Effect I). Note that a definition of an opening part 23a of each bridge section 23, and end-to-end distances (reference signs A to E in FIG. 4A) of the opening parts 23a of the bridge sections 23 will be described later.

In each bridge section 23, the opening part 23a (a window part) formed on the upper surface 21a of the upper surface member 21 exhibits a rectangular shape or a trapezoidal shape in planar view. Moreover, on the upper surface 21a of the upper surface member 21, a sum of opening areas of the opening parts 23a of the respective bridge sections 23 is larger than an area of other general parts (to be described later in Operation and Effect II).

Meanwhile, each bridge section 23 is formed into a shape of a reversed fan such that a distance between bridge side surfaces 23b becomes longer as the bridge side surfaces 23b come closer to the upper surface 21a of the upper surface member 21 (to be described later in Operation and Effect III). Here, in this embodiment, each bridge section 23 adopts a configuration in which only the upper surface member 21 is recessed toward the lower surface member 22, thereby striking on the lower surface member 22. As a result, the recesses of the bridge sections 23 to be formed on the upper surface 21a of the upper surface member 21 are formed only on the upper surface member 21 side (to be described later in Operation and Effect IV). In the meantime, it is possible to form the opening parts 23a of the bridge sections larger than those in a conventional example as well.

As shown in FIG. 2, the bridge sections 23 are formed in two rows each containing nine pieces (a total of eighteen pieces) so as to be arranged in a width direction of the body portion 20a along the longitudinal direction (the wheel circumferential direction X) of the sub air chamber member 20.

The bridge sections 23 formed by joining the upper surface member 21 and the lower surface member 22 to each other in the sub air chamber SC are configured to enhance mechanical strength of the sub air chamber member 20 and to more effectively exert a sound deadening function to be described later by suppressing a variation in volume of the sub air chamber SC attributed to a pressure variation caused by resonance of the resonator.

The above-described sub air chamber member 20 of this embodiment is assumed to be a resin molded product. Here, in the case of the resin product, it is desirable to use a resin which is light in weight, high in rigidity, and adaptable to blow molding in consideration of its weight saving, improvement in mass productivity, reduction in manufacturing costs, ensuring airtightness in the sub air chamber SC, and so forth. Among such resins, polypropylene is particularly desirable for its high resistance to repeated bending fatigue.

[Configuration of Sub Air Chamber SC]

The volume of the sub air chamber SC is set preferably in a range from about 50 to 300 cc. By setting the volume of the sub air chamber SC within this range, the sub air chamber member 20 (the Helmholtz resonator) can fully exert the sound deadening effect and suppress an increase in weight thereof, thus enabling weight saving of the vehicle wheel 100. Meanwhile, a length in the wheel circumferential direction X (see FIG. 2) of the sub air chamber member 20 can be set appropriately by defining a length half as long as a circumferential length of the rim 11 (see FIG. 1) (a circumferential length of the outer peripheral surface 11d of the well portion 11c) as a maximum, while taking into account adjustment in weight of the vehicle wheel 100 as well as ease of attachment to the well portion 11c.

As shown in FIGS. 2 and 3, the communication hole 19 provided to the sub air chamber member 20 establishes communication on the well portion 11c (see FIG. 1) between the sub air chamber SC and a tire air chamber MC (see FIG. 6) to be defined in a space with an not-illustrated tire.

A cross-sectional shape of the communication hole 19 is not limited to a particular shape, and may be any of an oval shape, a circular shape, a polygonal shape, a D-shape, and the like. A diameter of the communication hole 19 is set preferably equal to or above 5 mm when the cross section is of the circular shape. Meanwhile, the communication hole 19 having the cross-sectional shape other than the circular shape preferably has a cross sectional area that can be converted into a cross-sectional area of a circular shape having a diameter equal to or above 5 mm.

A length of the communication hole 19 is set so as to satisfy a formula to obtain a resonance frequency of the Helmholtz resonator expressed by the following (Formula 1):

$$f_0 = C/2\pi \times \sqrt{(S/V(L+\alpha \times \sqrt{S}))} \quad \text{(Formula 1);}$$

in which $f_0$ (Hz): resonance frequency,

C (m/s): sound velocity inside sub air chamber SC (=sound velocity inside tire air chamber MC), $(m^3)$: volume of sub air chamber SC, L (m): length of communication hole 19, S $(m^2)$: cross-sectional area of opening part of communication hole 19, and α: correction coefficient.

Note that the resonance frequency $f_0$ is matched to a resonance frequency of the tire air chamber MC.

[Attachment of Sub Air Chamber Member 20]

As shown in FIG. 2, each of the edge portions 14a and 14b of the sub air chamber member 20 extends from the body portion 20a in a lateral direction (the wheel width direction Y) of the sub air chamber member 20. These edge portions 14a and 14b are configured to lock the sub air chamber member 20 with the well portion 11c (see FIG. 1). The edge portions 14a and 14b will be described later.

As shown in FIG. 4A, beads 24 are formed in the lower surface member 22. As shown in FIG. 5, the beads 24 are formed by rendering the lower surface member 22 partially recessed toward the upper surface member 21. As shown in FIG. 4A, the beads 24 in this embodiment extend in the width direction (the wheel width direction Y) of the sub air chamber member 20. The beads 24 enhance surface rigidity of the lower surface member 22.

Next, a mode of attachment of the sub air chamber member 20 to the well portion 11c (see FIG. 1) will be described.

FIG. 6 is a partial cross-sectional view of the vehicle wheel according to the embodiment, which shows positional relations among the sub air chamber member 20 attached to the well portion 11c, as well as hump portions and a vertical wall thereof. In FIG. 6, reference sign SC denotes the sub air chamber and reference sign MC denotes the tire air chamber formed between a tire 30 and the well portion 11c.

As shown in FIG. 6, the edge portion 14a and the edge portion 14b are formed to extend in the wheel width direction Y from the body portion 20a formed of the upper surface member 21 and the lower surface member 22 as described previously. Then, the edge portion 14a extends from the body portion 20a toward a first vertical wall surface 16a, and a front end thereof is engaged with a groove portion 17a of the first vertical wall surface 16a. Meanwhile, the edge portion 14b extends from the body portion 20a toward a second vertical wall surface 16b, and a front end thereof is engaged with a groove portion 17b of the second vertical wall surface 16b. The groove portions 17a and 17b are formed by machining on the vertical wall 15 and a side surface part 11e, respectively.

The edge portion 14a and the edge portion 14b extending toward the first vertical wall surface 16a and the second vertical wall surface 16b are integrated with the curved lower surface member 22, thereby forming a curved surface that protrudes to the outer peripheral surface 11d side of the well portion 11c. Moreover, the edge portions 14a and 14b possess spring elasticity owing to appropriate selection of thicknesses and materials thereof.

As shown in FIG. 6, the rim 11 includes: the bead seat portions 11a formed at two ends in the wheel width direction Y; rim flange portions 11bd each bent into an L-shape from the corresponding bead seat portion 11a outward in a wheel radial direction Z; and the above-described well portion 11c located between the bead seat portions 11c and recessed inward in the wheel radial direction.

The bead seat portions 11a are provided to install bead portions 30a of the tire 30 at the time of rim assembly to attach the tire 30 to the rim 11.

In addition, each bead seat portion 11a includes a hump portion 11f projecting outward in the wheel radial direction, which is located short of a section where the bead seat portion 11a sinks in the well portion 11c.

In the vehicle wheel 100 according to this embodiment, a height of a peak portion of the vertical wall 15 from the outer peripheral surface 11d of the well portion 11c is set smaller than a height of a peak portion of the hump portion 11f, which is located on the second vertical wall surface 16b side, from the outer peripheral surface 11d of the well portion 11c.

Next, operations and effects achieved by the vehicle wheel 100 of this embodiment will be explained.

The resonator for the vehicle wheel disclosed in Patent Literature 1 has a rib shape on its upper surface in order to ensure rigidity. Meanwhile, there is a method of providing bridges by causing the upper surface and the lower surface to strike on each other for further ensuring the rigidity.

However, even when the bridges are provided as described above, there is a case in which a surface deformation occurs at a general part on the upper surface located away from the bridges when an internal pressure is generated, or in other words, there occurs a change in volume of the sub air chamber SC, which may result in failure to obtain a sufficient sound deadening amount. Now, a description will be given below while comparing problems of the configuration to provide the bridges with operations and effects of the sub air chamber member 20 of this embodiment to solve the problems.

Comparative Example

Figure 7:
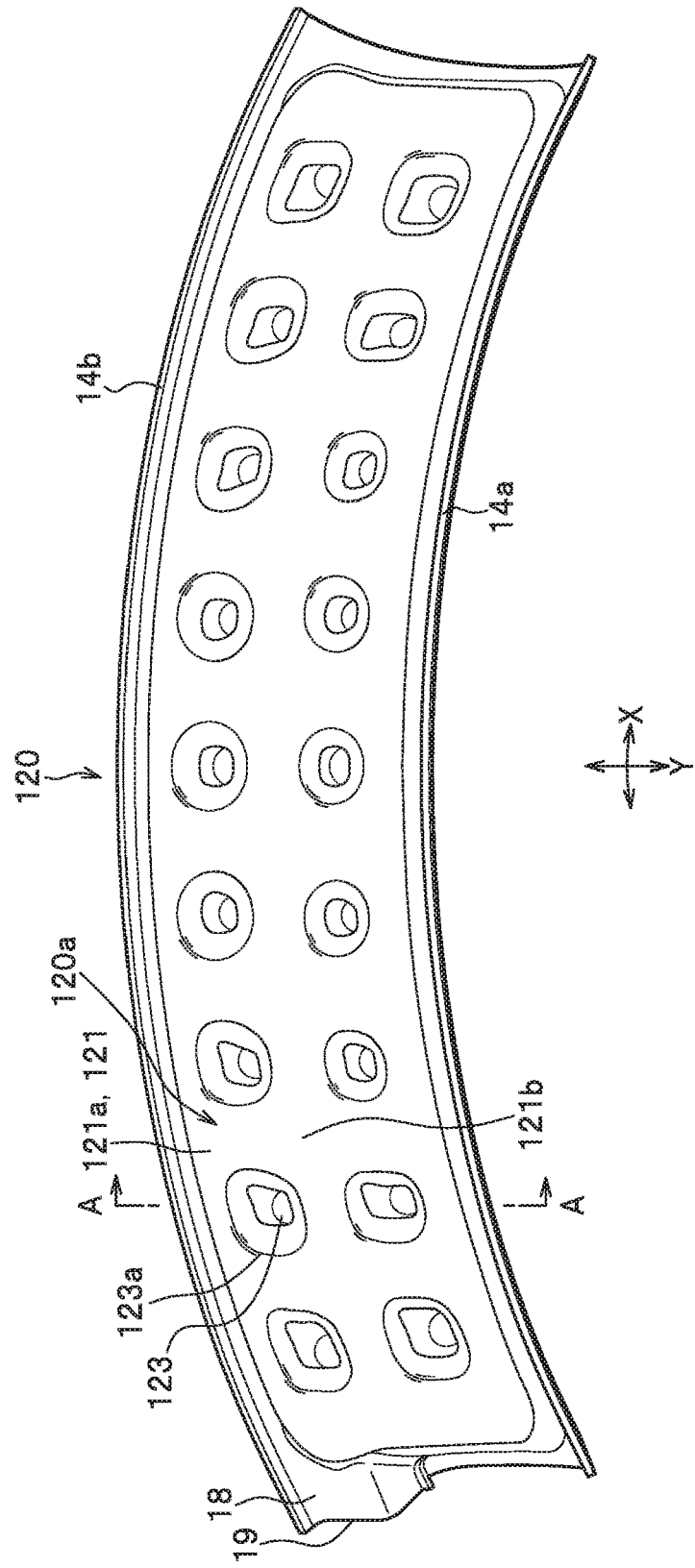
FIG. 7 is an overall perspective view of a sub air chamber member of a comparative example.
Figure 8:
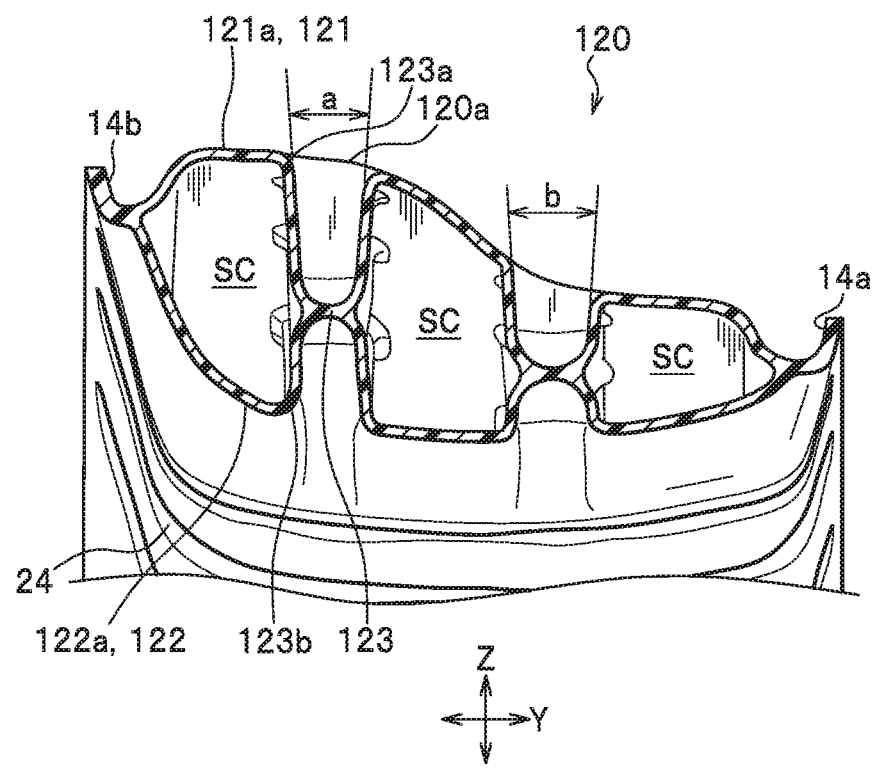
FIG. 8 is a cross-sectional view showing the sub air chamber member cut away along the A-A line in FIG. 7.

FIG. 7 is an overall perspective view of a sub air chamber member 120 of a comparative example. FIG. 8 is a cross-sectional view showing the sub air chamber member 120 cut away along the A-A line in FIG. 7

As shown in FIGS. 7 and 8, a body portion 120a of the sub air chamber member 120 (the Helmholtz resonator) of the comparative example includes an upper surface member 121, a lower surface member 122 which forms a sub air chamber SC in a space with the upper surface member 121, and multiple bridge sections 123 which cause the upper surface member 121 and the lower surface member 122 to strike on and get joined to each other.

As shown in FIG. 8, each bridge section 123 is formed such that the upper surface member 121 is recessed toward the lower surface member 122 and that the lower surface member 122 is also recessed toward the upper surface member 121. Specifically, in the sub air chamber member 120 of the comparative example, the member 121 and the surface member 122 are recessed from two directions and come close to each other, and front end portions thereof are joined to each other to form the bridge sections 123. In the bridge sections 123, each of opening parts 123a formed on an upper surface 121a of the upper surface member 121 and opening parts 123b formed on a lower surface 122a of the lower surface member 122 exhibits a substantially circular shape in planar view. By providing the above-described bridge sections 123, it is possible to reduce the surface deformation and to ensure the rigidity as with the embodiment.

However, in the sub air chamber member 120 provided with the bridge sections 123, there is a case in which a surface deformation occurs at a general part 121b on the upper surface 121a of the upper surface member 121 located away from the opening parts 123a of the bridge sections 123 when an internal pressure is generated due to a pressure variation caused by resonance of the resonator, which may result in failure to obtain a sufficient sound deadening amount.

On the other hand, the sub air chamber member 20 of this embodiment has the configuration of the bridge sections 23 in which only the upper surface member 21 is recessed toward the lower surface member 22, thus striking on the lower surface member 22 as shown in FIG. 4A. The opening parts 23a of the bridge sections 23 are formed only on the upper surface member 21 side. In the sub air chamber member 20 of this embodiment, the area of the opening parts 23a of the bridge sections 23 accounts for the majority of the area of the upper surface 21a of the upper surface member 21 of the sub air chamber member 20. In this embodiment, a proportion of the area of the opening parts 23a to the area of the upper surface 21a of the upper surface member 21 of the sub air chamber member 20 is in a range from 20% to 80%. In other words, a ratio of the area of general parts (namely, the portion of the upper surface 21a without the opening parts 23a) is minimized. As described above, in this embodiment, it is possible to open the opening parts 23a of the bridge sections 23 in the large area on the upper surface 21a of the upper surface member 21 of the sub air chamber member 20. Thus, the sub air chamber member 120 can prevent occurrence of a surface deformation (a change in volume of the sub air chamber SC) on the upper surface 121a of the upper surface member 121 when an internal pressure is generated, thus obtaining a sufficient sound deadening amount.

Reasons why the sub air chamber member 20 of this embodiment can adopt the above-described configuration, and operations and effects of the sub air chamber member 20 will be described. The operation and effects can be considered in terms of categories I to III corresponding to the constituents.

<Explanation of Operation and Effect I>

As indicated with reference signs A to E in FIG. 4A, in the sub air chamber member 20 of this embodiment, each of end-to-end distances of the opening parts 23a (diagonal width distances of the opening parts 23a) of the bridge sections 23 on the upper surface 21a of the upper surface member 21 (reference signs A and B in FIG. 4A) is set longer than each of end-to-end distances of the opening parts 23a of the adjacent bridge sections 23 (distances of the general parts each provided between a certain opening section 23 and its adjacent opening section 23) (reference signs C, D, and E in FIG. 4A). In other words, the sub air chamber member 20 of this embodiment is configured to satisfy:

A>C, D, E; and

B>C, D, E.

Figure 4B:
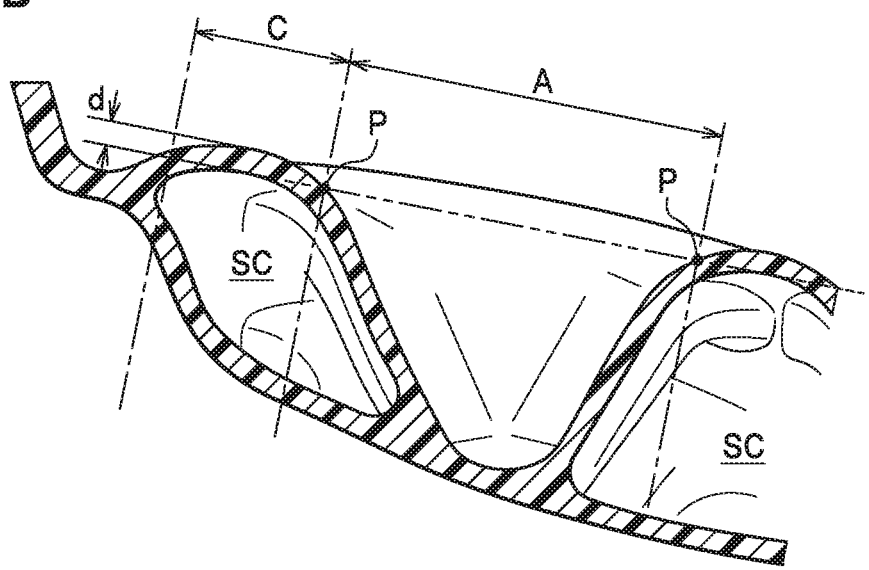
FIG. 4B is an enlarged diagram of a substantial part of an upper surface portion of an upper surface member indicated with reference signs A and C in FIG. 4A.

Here, in this embodiment, points P of origin constituting starting points and ending points of the above-mentioned dimensions A to E are defined as described below. FIG. 4B is an enlarged diagram of a substantial part of the upper surface 21a portion of the upper surface member 21 indicated with the reference signs A and C in FIG. 4A. As shown in FIG. 4B, the upper surface member 21 and the lower surface member 22 of the sub air chamber member 20 formed of the resin have a predetermined thickness which is defined as a thickness d. The sub air chamber SC is defined by the bridge sections 23, each of which is formed by causing the upper surface member 21 with the thickness d to be recessed toward the lower surface member 122 and causing the upper surface member 21 and the lower surface member 122 to strike on each other. A point where a virtual line, which connects a peak point of one section in the sub air chamber SC to a peak point of another section in the sub air chamber SC adjacent thereto as indicated with a chain double-dashed line in FIG. 4B, intersects with a certain side surface (an opening surface) of the opening part 23a of the bridge section 23 is defined as each point P of origin.

Meanwhile, as shown in FIG. 2, the sub air chamber member 20 of this embodiment includes the edge portions 14a and 14b to be engaged with the well portion 11c of the wheel, which are located at the end portions (the engagement portions). In this case, each of the end-to-end distances of the opening parts 23a (the diagonal width distances of the opening parts 23a) of the bridge sections 23 on the upper surface 21a of the upper surface member 21 (reference signs A and B in FIG. 4A) is set longer than distances to the edge portions 14a and 14b of the opening parts 23a of the bridge sections 23 (reference signs C and E in FIG. 4A), namely:

A>C; and

B>E.

By this configuration, the sub air chamber member 20 of this embodiment can suppress a surface deformation amount in case of an action of an internal pressure, and thus improve the sound deadening amount.

<Explanation of Operation and Effect II>

The sub air chamber member 20 of this embodiment is formed by using the dimensions of the opening parts 23a of the bridge sections 23 indicated with the reference signs A to E in FIG. 4A, thus adopting the configuration in which the area of the opening parts 23a of the bridge sections 23 is larger than the area of the general parts on the upper surface 21a of the upper surface member 21 as shown in FIG. 3. As described previously, the proportion of the area of the opening parts 23a to the area of the upper surface 21a of the upper surface member 21 of the sub air chamber member 20 is in the range from 20% to 80% (more preferably from 50% to 80%).

As can be seen from a comparison between the upper surface 21a of the upper surface member 21 of the sub air chamber member 20 shown in FIG. 2 and the upper surface 121a of the upper surface member 121 of the sub air chamber member 120 shown in FIG. 7, in this embodiment, the area of the opening parts 23a of the bridge sections 23 is substantially larger than the area of the general parts of the upper surface 21a of the upper surface member 21, and the proportion of the area of the opening parts 23a to the area of the upper surface 21a of the upper surface member 21 of the sub air chamber member 20 accounts for about 70%.

Here, it is needless to say that the area of the opening parts 23a of the bridge sections 23 of the upper surface 21a of the upper surface member 21 can be made larger than the area of other general parts of the upper surface 21a of the upper surface member 21 by setting the opening parts 23a of the bridge sections 23 to the above-mentioned dimensions (the reference signs A to E in FIG. 4A). Nonetheless, it is still possible to adopt the above-mentioned area ratio even when the above-described dimensions are not employed.

In this embodiment, by setting the area of the opening parts 23a of the bridge sections 23 of the upper surface 21a of the upper surface member 21 larger than the area of the general parts of the upper surface 21a of the upper surface member 21, it is possible to further enhance the rigidity of the upper surface 21a.

<Explanation of Operation and Effect III>

As indicated with arrows a and b in FIG. 8, in the sub air chamber member 120 of the comparative example, each bridge section 123 has a cross section equivalent to a bridge minimum draft (a draft with respect to a mold for forming the cross-sectional shape of the bridge).

On the other hand, as indicated with reference signs α and β in FIG. 4, side surface parts 23b of the bridge sections 23 are arranged to form a fan shape such that a distance between the two side surface parts 23b becomes longer as the side surface parts 23b come closer to the upper surface 21a of the upper surface member 21. That is to say, the sub air chamber member 20 of this embodiment has the fan-shaped bridge form (with the draft of 5 to 45 degrees) such that the draft of each bridge section 23 with respect to the mold for forming the cross-sectional shape of the bridge section 23 has a significantly larger angle than that of the corresponding draft in the comparative example.

As can be seen from a comparison between the bridge minimum draft cross sections of the sub air chamber member 120 of the comparative example indicated with the arrows a and b in FIG. 8 and the bridge fan-shaped cross sections of the sub air chamber member 20 of this embodiment indicated with the reference signs α and β in FIG. 4, the area of the opening parts 23a (the window parts) of the bridge sections 23 opening on the upper surface 21a of the upper surface member 21 of the sub air chamber member 20 can be increased by rendering the bridge fan-shaped cross sections of this embodiment different from the bridge minimum draft cross sections of the comparative example. For example, in the sub air chamber member 20 of this embodiment, the area of the opening parts 23a (the window parts) of the bridge sections 23 accounts for the majority of the area of the upper surface 21a of the upper surface member 21 (20% to 80%).

This configuration makes it possible to secure the large area of the opening parts 23a of the bridge sections 23 of the upper surface 21a of the upper surface member 21.

<Explanation of Operation and Effect IV>

Figure 9:
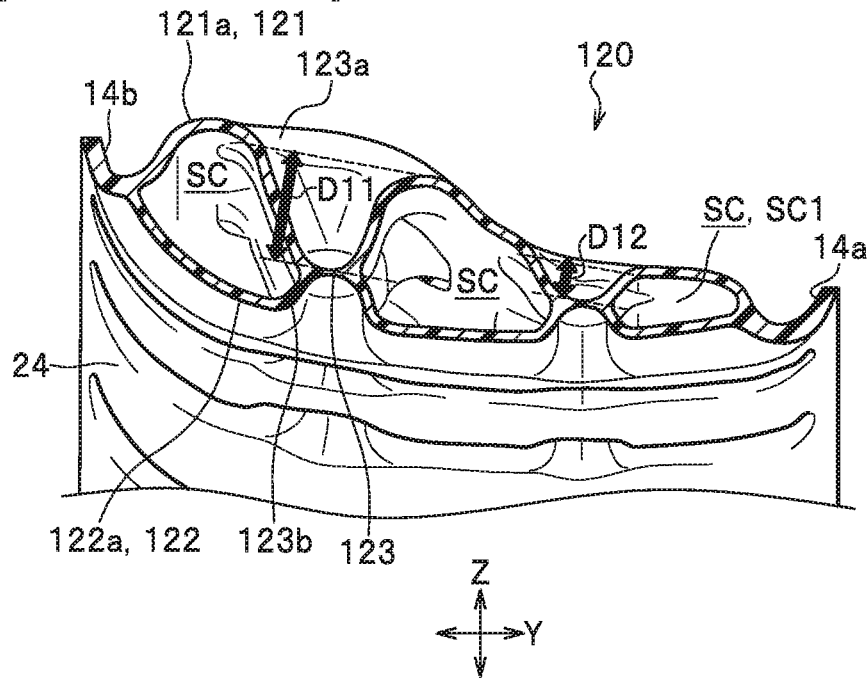
FIG. 9 is a cross-sectional view of the sub air chamber member of the comparative example.
Figure 10:
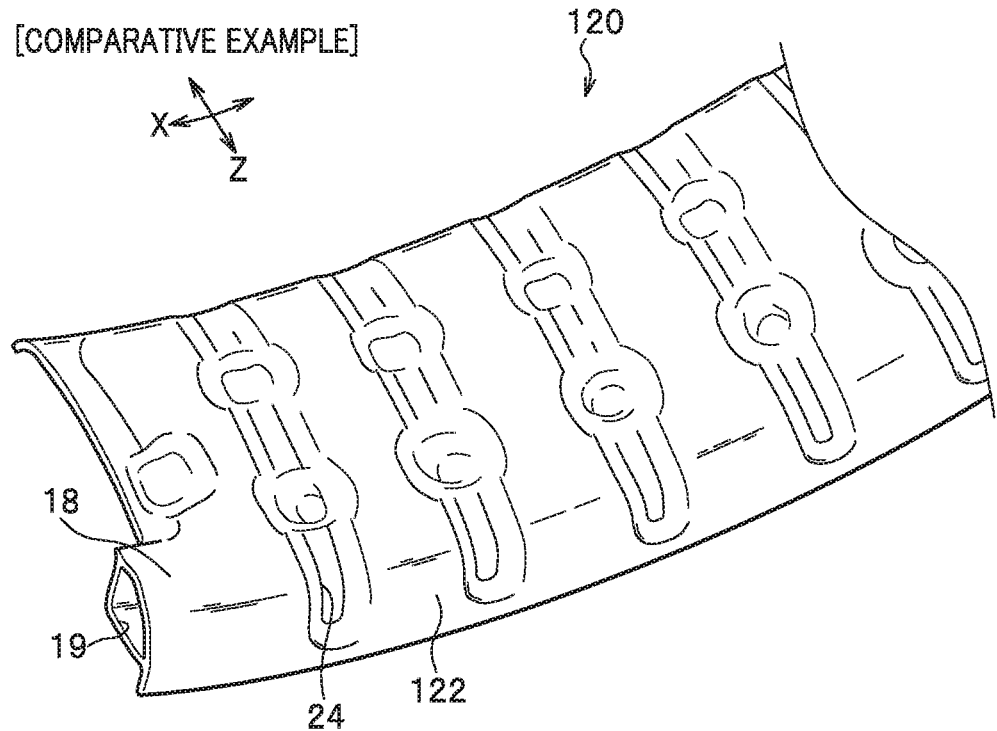
FIG. 10 is a perspective view of a substantial part of a lower surface of the sub air chamber member viewed from a concave side in FIG. 9.

FIG. 9 is a cross-sectional view of the sub air chamber member 120 of the comparative example. FIG. 10 is a perspective view of a substantial part of a lower surface of the sub air chamber member 120 viewed from a concave side in FIG. 9.

As shown in FIGS. 9 and 10, in the sub air chamber member 120 of the comparative example, the member 121 and the surface member 122 are recessed from the two directions and come close to each other, and the front end portions thereof are joined to each other to form the bridge sections 123. The bridge sections 123 include the opening parts 123a formed on the upper surface 121a of the upper surface member 121 and the opening parts 123b formed on the lower surface 122a of the lower surface member 122.

On the other hand, as shown in FIGS. 4A and 5, the sub air chamber member 20 of this embodiment has the configuration of the bridge sections 23 in which only the upper surface member 21 is recessed toward the lower surface member 22, thereby striking on the lower surface member 22. The opening parts 23a of the bridge sections 23 are hence formed only on the upper surface member 21 side. In the sub air chamber member 20 of this embodiment, the opening parts 23a of the bridge sections 23 open only on the upper surface 121a of the upper surface member 121.

The configuration of the bridge sections 23 of this embodiment will be compared with the configuration of the bridge sections 123 of the comparative example.

In the configuration of the bridge sections 123 of the comparative example, the bridge sections 123 are located in the middle of the upper and lower surfaces as indicated with reference signs D11 and D12 in FIG. 9. Accordingly, there is provided a small distance (a small depth) between a bottom part (a junction) of each bridge section 123 and the upper surface 121a of the upper surface member 121.

On the other hand, as indicated with reference signs D1 and D2 in FIG. 4A, the sub air chamber member 20 of this embodiment can increase each bridge depth by adopting the configuration of the bridge sections 23 in which only the upper surface member 21 strikes on the lower surface member 22, namely:

D1>D11; and
D2>D12.

Thus, it is possible to increase the area of the fan shape of each bridge section 23 and to enhance the surface rigidity.

Here, as can be seen from a comparison between FIG. 9 and FIG. 4, in the comparative example, a sub air chamber portion SC1 on the right side of FIG. 9 of the sub air chamber SC formed between the upper surface member 121 and the lower surface member 122 has a smaller volume.

Figure 11:
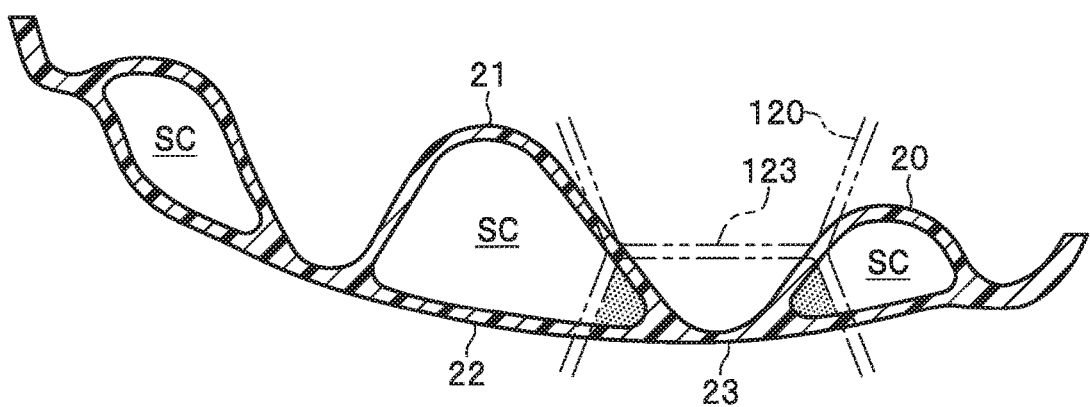
FIG. 11 is a schematic cross-sectional view explaining a difference in volume by comparing a configuration of the sub air chamber member of this embodiment with a configuration of the sub air chamber member of the comparative example.

FIG. 11 is a schematic cross-sectional view explaining a difference in volume by comparing the configuration of the sub air chamber member 20 of this embodiment with the configuration of the sub air chamber member 120 of the comparative example.

As shown in FIG. 11, when the configuration of the bridge sections 23 of this embodiment is adopted, it is possible to increase the volume equivalent to the area of hatched portions in FIG. 11 as compared to the configuration of the bridge sections 123 of the comparative example.

As described above, by adopting the configuration of the bridge sections 23 from one side according to the embodiment, it is possible to secure the large area of the bridge sections 23 from both of upper and lower sides and to enhance the surface rigidity. Moreover, since no opening parts of the bridge sections 23 are formed on the lower surface member 122, it is possible to ensure the volume of the resonator.

Furthermore, according to the vehicle wheel 100, it is possible to ensure the large volume of the sub air chamber SC.

Note that the embodiment has described the example of the configuration in which the sub air chamber member 20 is provided with the single Helmholtz resonator. Instead, the sub air chamber member provided to the vehicle wheel of the present invention may include multiple Helmholtz resonators arranged on a diagonal line passing the center of the rim 11.

REFERENCE SIGNS LIST 11 rim
11c well portion
12 disc
14a, 14b edge portion (engagement portion)
18 tube body
19 communication hole
20 sub air chamber member (Helmholtz resonator)
20a body portion
21 upper surface member
21a upper surface
22 lower surface member
23 bridge section
23a opening part (window part)
23b side surface part
30 tire
100 vehicle wheel
MC tire air chamber
SC sub air chamber
X wheel circumferential direction
Y wheel width direction
W partition wall
Z wheel radial direction
P point of origin of distance

The invention claimed is:

1. A vehicle wheel comprising:
a sub air chamber member as a Helmholtz resonator located in a tire air chamber and on an outer peripheral surface of a well portion, the sub air chamber member including
an upper surface member disposed inside the tire air chamber,
a lower surface member disposed on an outer peripheral surface side of the well portion, and
a plurality of bridge sections formed by causing the upper surface member and the lower surface member to strike on and get joined to each other, wherein
an end-to-end distance of an opening part of a certain one of the bridge sections opening on an upper surface of the upper surface member is set longer than a distance to an end portion of an opening part of a different one of the bridge sections adjacent to the certain bridge section and
wherein the sub air chamber member includes beads which are formed by rendering the lower surface member partially recessed toward the upper surface member, the beads extending in a width direction of the vehicle wheel.

2. The vehicle wheel according to claim 1, wherein an area of the opening parts of the bridge sections opening on the upper surface of the upper surface member is larger than an area of other general parts.

3. The vehicle wheel according to claim 2, wherein each bridge section is formed into a fan shape in which a distance between two opposed side surfaces becomes longer as the side surfaces come closer to the upper surface of the upper surface member.

4. The vehicle wheel according to claim 2, wherein, in each bridge section, only the upper surface member is recessed toward the lower surface member and strikes on the lower surface member.

5. The vehicle wheel according to claim 1, wherein each bridge section is formed into a fan shape in which a distance between two opposed side surfaces becomes longer as the side surfaces come closer to the upper surface of the upper surface member.

6. The vehicle wheel according to claim 5, wherein, in each bridge section, only the upper surface member is recessed toward the lower surface member and strikes on the lower surface member.

7. The vehicle wheel according to claim 5, wherein a draft of the bridge section with respect to a mold has a larger angle than a minimum draft.

8. The vehicle wheel according to claim 1, wherein, in each bridge section, only the upper surface member is recessed toward the lower surface member and strikes on the lower surface member.

9. The vehicle wheel according to claim 1, wherein
the sub air chamber member includes an engagement portion provided at an end portion of the sub air chamber member and designed to be engaged with the well portion, and
the end-to-end distance of the opening part of each bridge section opening on the upper surface of the upper surface member is set longer than a distance from an end portion of the opening part of the bridge section to the engagement portion.

* * * * *